Dec. 16, 1941.  H. A. CURRIE  2,266,170
STACKER
Filed Sept. 7, 1939    4 Sheets-Sheet 1
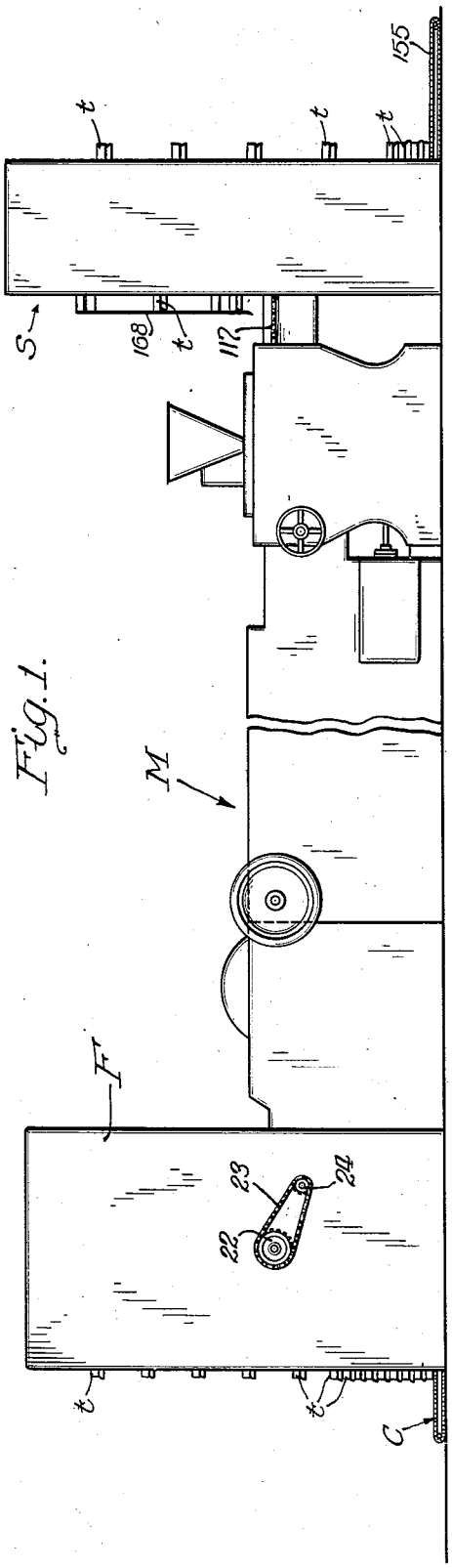
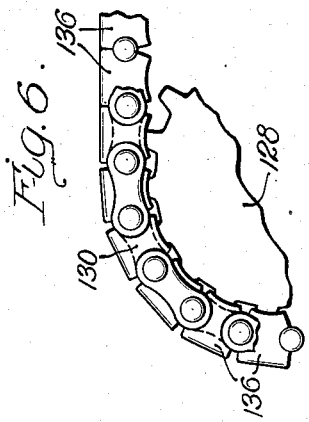
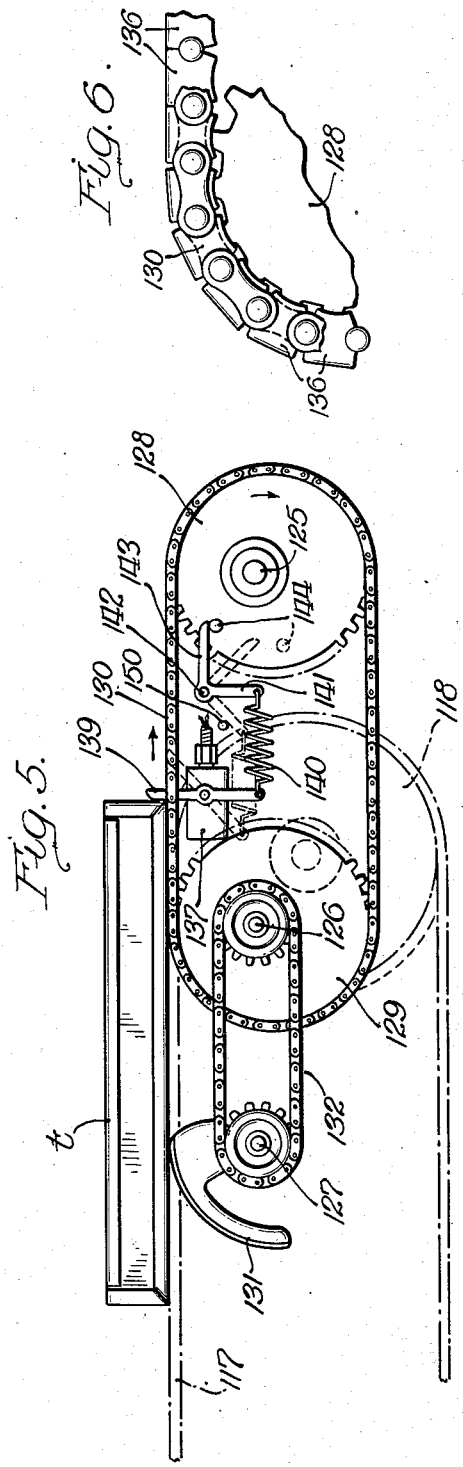
INVENTOR.
Hugh A. Currie
BY
ATTORNEYS.

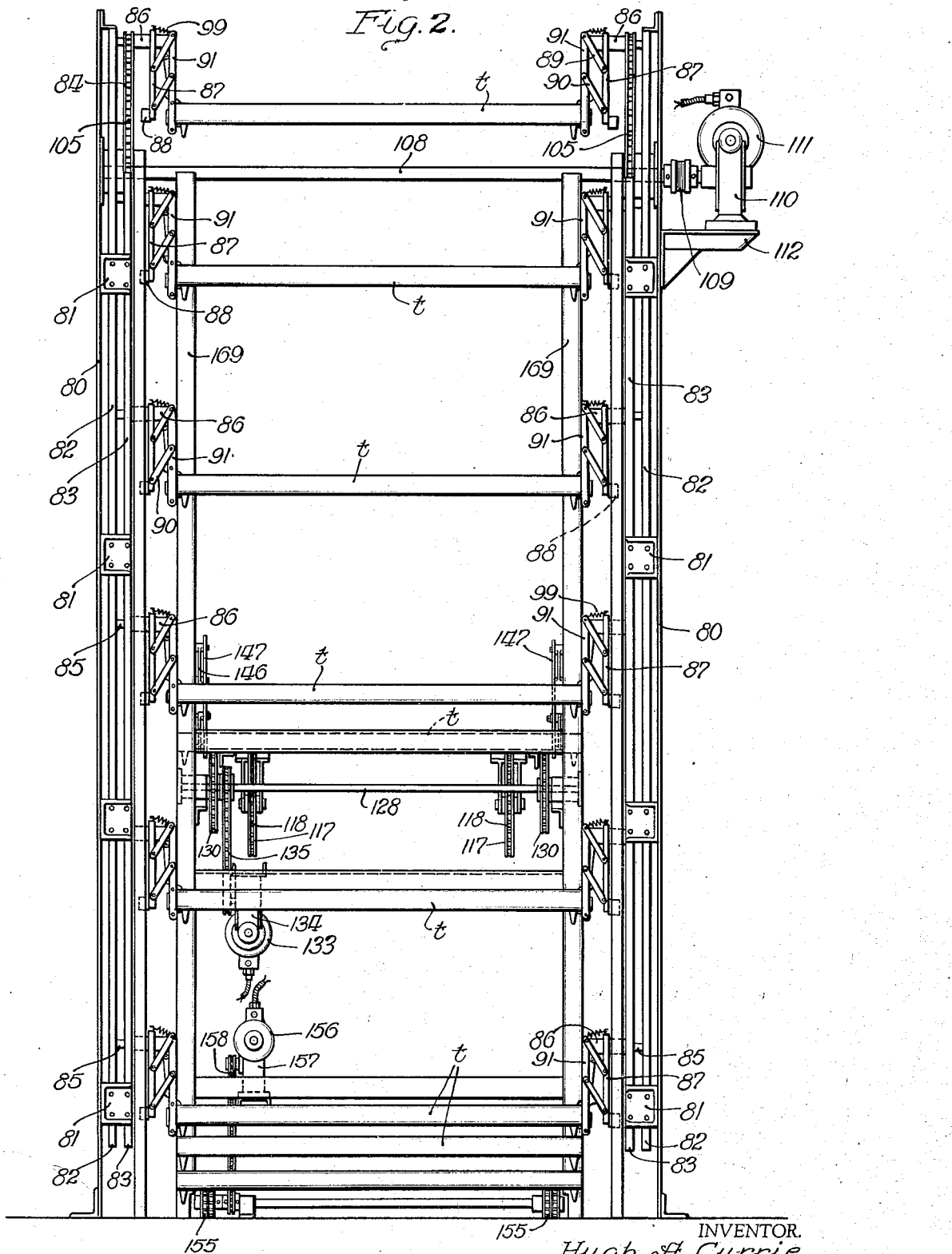

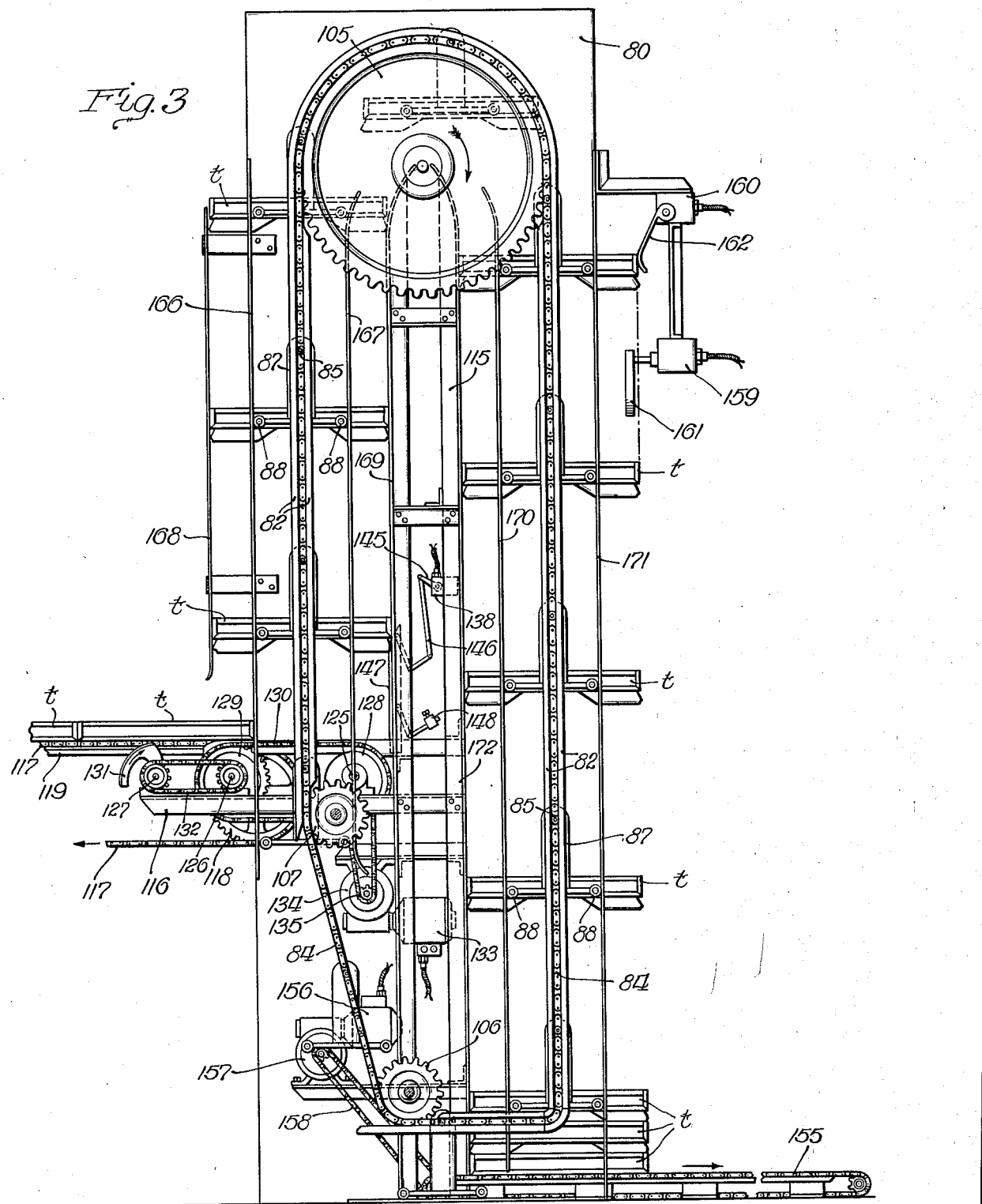

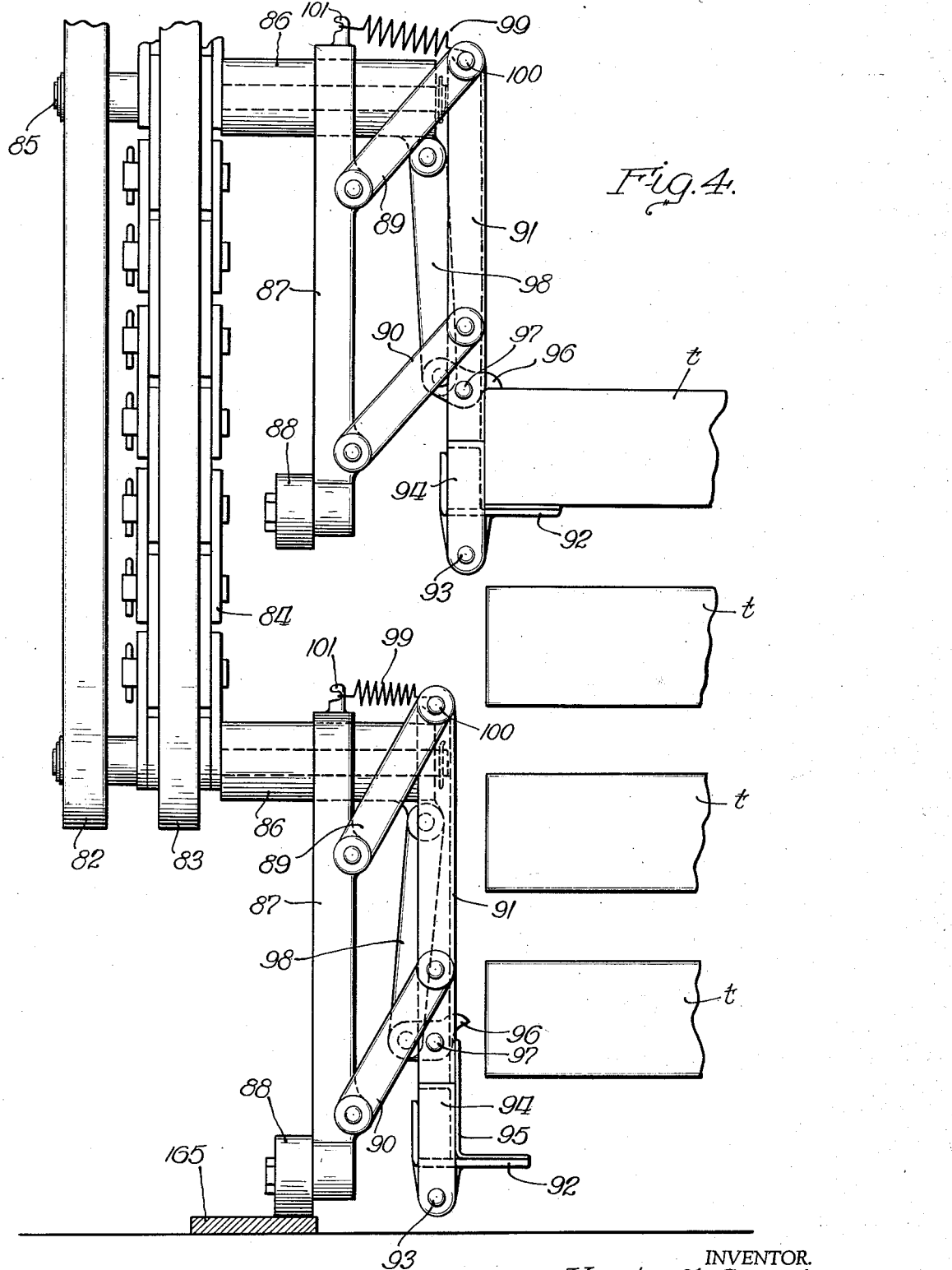

UNITED STATES PATENT OFFICE 2,266,170

STACKER

Hugh A. Currie, Chicago, Ill.

Application September 7, 1939, Serial No. 293,721

17 Claims. (Cl. 214—6)

This invention relates to stackers for use with machines for making confections such as candy, in which trays of starch, charged with molds of candy are delivered from a stack to a receiving station, dumped, recharged and delivered to a station for stacking, and the recharged trays are stacked for delivery to cooling rooms.

Machines for dumping the candy and starch from the starch trays, separating the starch from the candy, charging the trays with renovated starch, pressing mold cavities in the starch, filling the molds with molten candy mixture and delivering the charged trays to a station for stacking, to be transferred to a cooling room in which the candy mixture is permitted to set, are well known in this art. Such machines are commonly termed "moguls" and require no further detailed description here. A mogul is usually provided adjacent the tray receiving station thereof with a feeder for delivering trays from a stack of trays to the mogul. It is also known to provide a stacker at the delivery end of the mogul, for receiving and stacking the charged trays. The present invention is directed to a stacker which avoids subjecting the charged trays to objectionable jarring and vibration. A more specific feature of my invention is the provision of means controlled by the trays for gently lifting them from the delivery end or station of the mogul and transferring them from that station and stacking them. I also provide means for moving each stack of trays, as it is completed, into position to clear a succeeding stack to be formed. Further objects and advantages of my invention will appear from the detailed description.

In the drawings:

Figure 1 is a semi-diagrammatic side view of a candy making machine embodying my invention, partly broken away;

Figure 2 is a back view of the stacker;

Figure 3 is a side view of the stacker and the adjacent end portion of the mogul, the nearer side plate of the latter and of the stacker being removed and this view being more or less diagrammatic;

Figure 4 is a fragmentary detail back view of one of the stacker conveyor chains and tray carriers and associated parts;

Figure 5 is a detail side view, on an enlarged scale, of the eccentric means for transferring trays to the receiving station of the stacker, and associated parts; and Figure 6 is a fragmentary detail view, on an enlarged scale, of one of the chains of the eccentric means of Figure 5.

A complete candy making machine, shown rather diagrammatically in Figure 1, includes a suitable feeder F which delivers starch trays, charged with cooled and set candy mixture, to a mogul or apparatus M, which dumps the trays, separates the starch from the candy, refills the trays with renovated starch, presses mold cavities in the starch and recharges the trays with molten candy mixture, and a stacker S to which the recharged trays are delivered by the apparatus M, the stacker serving to stack the trays for transfer to cooling rooms in which the candy is permitted to cool and set preliminary to delivering the stacks of trays to the feeder F. The latter is provided with a stack conveyor C for supporting a stack of trays t and may be driven from the mogul in a suitable manner, as by means of sprocket wheels 22 and 24 and a chain 23. The feeder F delivers the trays from the stack to the receiving station of the mogul. The starch trays t preferably are of the type disclosed in Patent No. 1,994,664, issued March 19, 1935, to Adolf Pfitzer, although any other suitable tray may be used. These trays are provided at their ends with supporting legs which serve to space the trays, when stacked, apart in superimposed relation.

Referring to Figures 2, 3, and 4, the stacker frame comprises rectangular side plates 80 to which are secured channel brackets 81 carrying guide strips 82 and 83 defining guideways for conveyor chains 84. Suitably spaced stub shafts 85 are carried by the respective chains 84, replacing certain of the pintles thereof, these shafts projecting inward and outward beyond guide strips 83 with their outer portions operating between the strips 82. Each of the stub shafts 85 has a sleeve 86 rockably mounted on its inner portion. A substantially inverted T-shaped frame 87 is secured to and depends from sleeve 86, there being a roller 88 adjacent each end of the head at the bottom of this frame. Frame 87 is connected by upper and lower pairs of links 89 and 90, respectively, to an inner frame 91 which extends downward below links 90. An angle member 92 is pivoted, at 93, in a fork 94, at the lower end of frame 91 for rocking movement about a horizontal axis. The vertical arm of member 92, in its position shown in Figure 4, is of such extent as to contact the arms of fork 94 so as to limit turning movement of this member in clockwise direction beyond its position shown in Figure 4, whereas the horizontal flange of member 92 is of such width that it may pass between the arms of fork 94 and thus be moved into substantially vertical position, when required. Preferably, although not necessarily, a covering 95 of friction material, such as rubber, may be provided for the upper face of member 92, this covering conveniently extending along frame 91 a short distance above fork 94 thereof. Conveniently, frame 91 is of channel formation and receives, a short distance above fork 94, a gripping pawl 96 pivoted at 97 in frame 91, the outer end of this pawl being connected by a link 98 to the lower inner end portion of sleeve 86. A tension spring 99 connects the pivot 100 between frame 91 and links 89 to hook 101 extending from the upper end of frame 87. This tension spring urges frame 91 upward toward frame 87. In this upward movement of frame 91 gripping pawl 96 is, in effect, turned in counterclockwise direction about its pivot 97 from its position shown in the upper portion of Figure 4 into its position shown in the lower portion of this figure.

The chains 84 pass between the guide strips 83, over relatively large sprocket wheels 105 adjacent the top of the stacker frame and about idler sprocket wheels 106 and 107 appropriately mounted on the side plate 80 of the frame. Sprocket wheels 105 are the drive sprockets and are suitably secured on a drive shaft 108 rotatably mounted in an appropriate manner and driven, through a coupling 109 and a speed reducing unit 110 of known type, from an electric motor 111 mounted on a bracket 112 suitably secured to the frame of the stacker. The stacker may, of course, be driven in any other suitable manner.

The stacker is disposed to receive from the mogul trays charged with starch having therein mold depressions filled with candy mixture in molten or semi-liquid condition. It is important at this time that the trays be handled with care since rough handling thereof may result in displacement of the starch and resulting escape from one or more of the cavities of the candy mixture, resulting in spoiling the articles of candy being produced. I provide means whereby the charged trays are raised one at a time from the mogul and transferred to the stacker, and the receiving station of the latter, in position to be engaged by the tray carriers and transferred thereby to a stack of trays being formed.

The stacker includes a supplementary inner frame 115 disposed between the vertical runs thereof. A suitably disposed supporting structure 116 extends from supplementary frame 115 between the conveyor chains of the stacker and between the delivery chains of the mogul, one of which chains is shown at 117 as passing about a sprocket wheel 118. Any suitable number of chains 117, with corresponding sprockets 118, may be provided, the upper runs of these chains being suitably supported by angle strips 119, or in any other suitable manner. The recharged trays t are delivered to the upper runs of the chains 117 and are moved by the latter, by frictional contact, towards the stacker. It will be understood that the trays t of Figure 3 are provided with legs, at the ends thereof, as previously stated, but that the tray legs are omitted in Figure 3 for clearness of illustration, as to the trays resting upon the chains 117, the trays being handled in the stacker and the trays which have been stacked thereby being shown as provided with end legs.

The supporting structure 116 serves to support the means for effecting transfer of the trays from the mogul chains 117 to the receiving station of the stacker. This means comprises three parallel shafts 125, 126 and 127, sprocket wheels 128 and 129 secured on shafts 125 and 126, respectively, eccentric thereto, connected by sprocket chain 130, a mutilated eccentric 131 secured on shaft 127 and a chain and sprocket drive 132 between shafts 126 and 127 effective for driving them at the same speed. Shaft 125 conveniently is driven by an electric motor 133, through a speed reducing unit 134 and a chain and sprocket drive 135, both of known type. In practice, two or more mutilated eccentrics 131 and two or more of each of the eccentrically mounted sprocket wheels 129 and 128 are provided, the eccentrics 131 and 129 operating between two adjacent mogul delivery chains 117. The members 128, 129 and 131 all have the same angular relation with respect to their individual axes so that in the low position of such members, shown in Figure 5, the upper portion of eccentric 131 is in the plane of the upper run of mogul chain 117 and the upper run of chain 130 is in the plane of the upper run of chain 117. Chain 130 preferably is of known anti-whip construction and comprises wedge-like plates 136, as shown in Figure 6, associated with the links of the chain in such manner as not to interfere with the action of the chain when passing about a sprocket wheel, these plates contacting end to end between the sprocket wheels so as to provide a substantially rigid support therebetween.

Motor 133 is controlled by two switches 137 and 138. Switch 137 is appropriately mounted on the structure 116 and is provided with a control arm 139 which normally projects above the upper run of chain 130, as shown in full lines in Figure 5. The lower end of arm 139 is connected, by a tension spring 140, to the lower end of one arm of a bellcrank lever 141 pivoted at 142, the other arm 143 of which bellcrank lever is disposed for contact by a pin 144 projecting from sprocket wheel 128. When arm 139 of switch 137 is in the position shown in Figure 5, this switch is open and the motor 133 is not operated.

Switch 138 is provided with an operating arm 145 connected, by suitable linkage 146, to an angle rail 147 appropriately mounted for movement toward and from supplementary frame 115, the mounting means for rail 147 including counterweight means 148 to assure ease in operation of the rail. The mounting of rail 147 is such that it tends to move away from supplementary frame 115, by gravity, such movement of the rail moving arm 145, through the linkage 146, in a direction to close the switch 138.

The trays t are moved with the mogul chains 117 toward the stacker, the trays on the upper run of the chains 117 nearest the stacker contacting the upper end of arm 139 and turning the latter clockwise into the dotted line position of Figure 5. That closes the switch 137. If the switch 138 be now also closed, motor 133 will be set into operation, causing rotation of the shafts 125, 126 and 127. The mutilated eccentrics 131 and the chains 130 raise the tray resting thereon and pin 144 passes from beneath the end of arm 143 of the bellcrank 141, the latter being then swung into the dotted line position of Figure 5 by the tension of spring 140, turning of the bellcrank in clockwise direction being limited by a stop pin 150. Thereafter switch 137 remains closed and in the continued operation of the eccentrics the tray is moved into position at the receiving station of the stacker, in contact with the angle rail 147 which it restores to its position shown in Figure 3. As the tray approaches this position in the stacker, pin 144 contacts arm 143 of bellcrank 141 returning the latter to its full line position shown in Figure 5, thus opening switch 137, if there is no tray in position to prevent opening of this switch, such movement of the bellcrank occurring at the end of a complete revolution of the sprocket wheel 128 and simultaneously with movement of rail 147 into switch opening position. If movement of arm 139 into switch opening position is prevented by a tray, the opening of switch 138 suffices to prevent operation of the transfer mechanism until a tray previously delivered to the receiving station of the stacker has been moved into position to clear the rail 147 and to assure that the next entering tray will be in position to be immediately grasped by opposed tray carriers of the stacker. To that end, the angle rail 147 is made of such length that when a tray moving upward in the stacker clears this rail, the opposed tray carriers immediately following that tray will be in position to receive a tray delivered by the transfer means to the receiving station of the stacker. In that manner I assure delivery of the charged trays from the mogul to the stacker, one at a time, during continued operation of the stacker, and at such a rate as to assure that each tray will arrive at the receiving station of the stacker at the proper time to assure that it will be promptly received by opposed carriers of the stacker, which is conducive to handling large numbers of trays while avoiding objectionable jarring and vibration such as would be caused by continual stopping and starting of the stacker.

It will be seen that the mutilated eccentrics 131 and the eccentrically mounted sprocket wheels 128 and 129, and associated parts, provide tray controlled means for gently raising the trays from the delivery end or station of the mogul and delivering them to the receiving station of the stacker, without subjecting the trays and their contents to objectionable jarring. That is an important feature of my invention and the advantages thereof, with respect to avoiding injury to the tray contents, will be obvious. A further advantage of this eccentric mechanism is that it may readily be timed in proper relation to the timing of operation of the stacker conveyor chains. While the stacker conveyor chains preferably are continuously driven, with a view to increased capacity, as above stated, it will be understood that that is not essential to the broader aspects of my invention.

The trays are transferred by the stacker from the mogul to the upper run of a stack conveyor which extends below the outer vertical run of the stacker conveyor and extends outward a suitable distance beyond the stacker. The conveyor 155 is driven by an electric motor 156, through a suitable speed reduction unit 157 and chain and sprocket drive 158, of known type. Motor 156 is controlled by two switches 159 and 160, both normally opened. Switch 159 is provided with an operating arm 161 disposed for contact by downwardly moving trays being stacked upon the conveyor 155, this movement of arm 161 by the trays serving to close switch 159 momentarily. When the stack of trays reaches a predetermined height, such as thirty trays, the topmost tray of the stack remains in contact with arm 161 maintaining the latter in switch closing position. When that occurs, closing of switch 160 results in closing of the circuit of motor 156, thus operating the conveyor 155 and moving the stack of trays out of the stacker, into position to clear the succeeding trays traveling downward in the stacker for forming a further stack.

Switch 160 is provided with an operating arm 162 disposed for contact by a passing tray and moved thereby into switch closing position. In that manner switch 160 is closed for a short time by each tray traveling downward in the stacker, as is switch 159. It will be noted, however, that the switches 159 and 160 are so disposed that they are not both closed at the same time, except upon completion of a stack of thirty trays which it is desired to move out of the stacker, the tray immediately following topmost tray of the stack then serving to close switch 160 and thus complete the circuit of motor 156 for operating the conveyor 155 and moving the stacks out of the stacker, in the manner above described.

In Figure 4 I have shown four trays disposed in suitable relation, as constituting the beginning of a stack, the legs of the trays being omitted for clearness of illustration. The top tray is shown as held at one end thereof in a tray carrier, it being understood that in practice the tray is held at both ends between two opposed tray carriers. After the tray has been deposited upon the top of the stack being formed, the carrier continues in downward travel, tension springs 99 serving to move frame 91 upward and outward as frame 87 moves downward, thus moving fork 94 into position to clear the ends of the underlying trays. At that time the frame 91 occupies substantially the position shown at the lower portion of Figure 4. In the continued downward travel of the carrier the inner flange of angle member 92 contacts the next to the top tray of the stack, this angle member being then turned into a position substantially at right angles to that shown in Figure 4, in which position it remains until it passes below the end of the bottom tray of the stack, angle member 92 then returning to its normal position shown. In the lowest position of the tray carrier, rollers 88 thereof contact a metal guide strip 165 extending from front to back of the frame of the stacker below the conveyor thereof. That prevents turning of the carrier about the stub shaft 85. As the carriers approach the receiving station of the stacker, in their upward travel, they enter between spaced vertical guide strips 166 and 167 cooperating with rollers 88 for confining the carriers, and the trays supported thereby, against objectionable side sway. Further guide strips 168 and 169, cooperating with the sides of the upwardly traveling trays for restraining them against side sway, may be provided. I also provide, at the stack forming side of the stacker, vertical guide strips 170 and 171 cooperating with rollers 88 of the tray carriers for restraining the trays against objectionable side sway during their downward travel. If desired, a further vertical guide strip 172 may be provided, for cooperation with the inner sides of the downwardly traveling trays to further assist in restraining them against side sway.

After a stack of trays has been completed, it may be moved out of the stacker without interrupting the operation thereof, and a succeeding stack of trays formed. That is conducive to large capacity, which is desirable in this art. In general, the machine of my invention is continuous in operation, avoids subjecting the trays to objectionable vibration and jarring, and is of comparatively great capacity with corresponding increase in production.

I claim:

1. In means for handling recharged trays delivered from a candy making machine, continuously operated stacking means comprising pairs of opposed carriers moving past a receiving station, eccentric means for lifting trays one at a time from said machine and transferring them to said station, a motor for driving said eccentric means, a first switch controlling said motor, means for closing said switch actuated by a tray moved by said apparatus into position over said eccentric means, supplementary means for opening said switch and yieldingly holding it open actuated by said eccentric means at the end of each revolution thereof, a second switch controlling said motor, and means controlled by trays received at said station for closing said second switch when there is no tray at said station and opening it upon delivery of a tray to said station and maintaining it open during predetermined travel of the tray in said stacking means.

2. In a tray stacker, continuously driven conveyor means having an upwardly moving run and a downwardly moving run provided with means for transferring trays from a receiving station at the upwardly moving run and stacking them at the downwardly moving run, eccentric means for lifting trays one at a time and transferring them to said station from an associated apparatus, a motor for driving said eccentric means, and means controlled by trays above said eccentric means and trays transferred to said station for stopping said motor at the end of each revolution of said eccentric means and starting said motor when a tray transferred to said station has been moved upward a predetermined distance.

3. In a tray stacker, continuously driven conveyor means having an upwardly moving run and a downwardly moving run provided with means for transferring trays from a receiving station at the upwardly moving run and stacking them at the downwardly moving run, a stack conveyor extending beneath said downwardly moving run for receiving therefrom a stack of trays, a motor for driving said stack conveyor, a normally open switch controlling said motor, means actuated by the topmost tray of a stack for closing said switch and holding it closed, a second normally open switch controlling said motor, and means actuated by a downwardly moving tray above the stack for closing said second switch and holding it closed until said stack conveyor has moved the stack of trays clear of said stacker.

4. In a tray carrier for a tray stacker, a mounting sleeve, a depending frame secured to said sleeve, a second frame parallel with said first frame, linkage connections between said frames maintaining them in parallelism while permitting said second frame to swing downward and away from and upward and toward said first frame, a tray engaging angle member pivoted on the lower end of said second frame, and means yieldingly holding said second frame in raised position.

5. In a tray carrier for a tray stacker, a mounting sleeve, a depending frame secured to said sleeve, a second frame parallel with said first frame, linkage connections between said frames maintaining them in parallelism while permitting said second frame to swing downward and away from and upward and toward said first frame, a tray engaging angle member pivoted on the lower end of said second frame for engagement about and beneath the end of a tray, means associated with said second frame for gripping the upper edge of a tray end engaged by said engaging member, and means yieldingly holding said second frame in raised position.

6. In a tray stacker for removing trays from a delivery station of an associated apparatus and stacking them, continuously driven conveyor means having an upwardly moving run and a downwardly moving run provided with means for transferring trays from a receiving station at the upwardly moving run and stacking them at the downwardly moving run, intermittently operated means for moving trays from said delivery station to said receiving station, a motor for driving said moving means, and means controlled by trays at said delivery station and trays transferred to said receiving station for stopping said motor upon completion of each operation of said moving means and starting said motor when trays moved to said receiving station have been moved upward a predetermined distance.

7. In a tray stacker for removing trays from a delivery station of an associated apparatus and stacking them, continuously driven conveyor means having an upwardly moving run and a downwardly moving run provided with means for transferring trays from a receiving station at the upwardly moving run and stacking them at the downwardly moving run, intermittently operated means for moving trays from said delivery station to said receiving station, means for driving said moving means, and means controlled by trays at said delivery station and trays transferred to said receiving station for disabling said driving means upon completion of each operation of said moving means and enabling said driving means when trays moved to said receiving station have been moved upward a predetermined distance.

8. In a tray stacker for removing trays from a delivery station of an associated apparatus and stacking them, conveyor means comprising pairs of opposed carriers moving past a receiving station, eccentric means for lifting trays one at a time from said delivery station and moving them to said receiving station, means for driving said eccentric means, and tray controlled means for disabling said driving means upon completion of each operation of said eccentric means and enabling said driving means when trays moved to said receiving station have been moved a predetermined distance therefrom by said conveyor means.

9. In a tray stacker for removing trays from a delivery station of an associated apparatus and stacking them, conveyor means having an upwardly moving run and a downwardly moving run provided with means for transferring trays from a receiving station at the upwardly moving run and stacking them at the downwardly moving run, eccentric means for lifting trays from said delivery station and moving them to said receiving station, means for driving said eccentric means, and tray controlled means for disabling said driving means upon completion of each operation of said eccentric means and enabling said driving means when trays transferred to said receiving station have been moved upward a predetermined distance by said conveyor means.

10. In a tray stacker for removing trays from a delivery station of an associated apparatus and stacking them, conveyor means having an upwardly moving run and a downwardly moving run provided with means for transferring trays from a receiving station at the upwardly moving run and stacking them at the downwardly moving run, intermittently operated means for moving trays from said delivery station to said receiving station, means for driving said moving means, and tray controlled means for disabling said driving means upon completion of each operation of said moving means and enabling said driving means when trays moved to said receiving station have been moved upward a predetermined distance by said conveyor means.

11. In a tray stacker for removing trays from a delivery station of an associated apparatus and stacking them, conveyor means having an upwardly moving run and a downwardly moving run provided with means for transferring trays from a receiving station at the upwardly moving run and stacking them at the downwardly moving run, intermittently operated means for lifting trays from said delivery station and moving them to said receiving station, means for driving said lifting and moving means, and tray controlled means for disabling said driving means upon completion of each operation of said lifting and moving means and enabling said driving means when trays moved to said receiving station have been moved upward a predetermined distance by said conveyor means.

12. In a tray stacker for removing trays from a delivery station of an associated apparatus and stacking them, conveyor means having an upwardly moving run and a downwardly moving run provided with means for transferring trays from a receiving station at the upwardly moving run and stacking them at the downwardly moving run, intermittently operated means for lifting trays one at a time from said delivery station and moving them to said receiving station while maintaining the trays in horizontal position, means for driving said lifting and moving means, and means controlled by trays moved from said delivery station to said receiving station for disabling said driving means upon completion of each operation of said lifting and moving means and enabling said driving means when trays moved to said receiving station have been moved upward a predetermined distance by said conveyor means.

13. In a tray stacker for removing trays from a delivery station of an associated apparatus and stacking them, conveyor means having an upwardly moving run and a downwardly moving run provided with means for transferring trays from a receiving station at the upwardly moving run and stacking them at the downwardly moving run, intermittently operated means for moving trays one at a time from said delivery station to said receiving station, means for driving said moving means, and means controlled by trays adjacent and transferred to said receiving station for disabling said driving means upon completion of each operation of said moving means and enabling said driving means when a tray has been moved a predetermined distance upward from said receiving station by said conveyor means.

14. In a tray carrier for a tray stacker, a mounting sleeve, a frame depending from said sleeve, a second frame parallel with said first frame, linkage connections between said frames maintaining them in parallelism while permitting said second frame to swing downward and away from and upward and toward said first frame, means yieldingly holding said second frame in raised position, a tray engaging member pivoted on said second frame for relative downward swinging movement into position substantially perpendicular to said second frame, and means positively limiting downward swinging movement of said member, the latter being movable upward about its pivot into substantially parallel relation to said second frame.

15. In a tray carrier for a tray stacker, a mounting sleeve, a frame depending from said sleeve, a second frame parallel with said first frame, linkage connections between said frames maintaining them in parallelism while permitting said second frame to swing downward and away from and upward and toward said first frame, means yieldingly holding said second frame in raised position, a tray engaging member pivoted on said second frame for relative downward swinging movement into position substantially perpendicular to said second frame, means limiting swinging movement of said member, a pawl on said second frame disposed to grip the upper edge of a tray end supported on said member, and means for moving said pawl into engagement with the upper edge of the tray end responsive to downward movement of said second frame.

16. In a tray carrier for a tray stacker, a mounting sleeve, a frame depending from said sleeve, a second frame parallel wtih said first frame, linkage connections between said frames maintaining them in parallelism while permitting said second frame to swing downward and away from and upward and toward said first frame, means yieldingly holding said second frame in raised position, a tray engaging member pivoted on said second frame for relative downward swinging movement into position substantially perpendicular to said second frame, means limiting swinging movement of said member, a pawl pivoted on said second frame for downward movement into gripping contact with the upper edge of a tray end supported on said member, and linkage connections between said sleeve and said pawl effective for swinging the latter downward and upward in accordance with downward and upward movement of said second frame relative to said first frame.

17. In a tray carrier for a tray stacker, a mounting sleeve, a frame depending from said sleeve, a second frame parallel with said first frame, linkage connections between said frames maintaining them in parallelism while permitting said second frame to swing downward and away from and upward and toward said first frame, means yieldingly holding said second frame in raised position, a tray engaging member pivoted on said second frame for relative downward swinging movement into position substantially perpendicular to said second frame, means limiting swinging movement of said member, a pawl pivotally mounted intermediate its ends on said second frame with its inner portion disposed for downward movement into gripping contact with the upper edge of a tray end supported on said member, and a link connecting the outer end of said pawl to said sleeve.

HUGH A. CURRIE.